United States Patent
Wilson et al.

(10) Patent No.: US 12,472,465 B2
(45) Date of Patent: Nov. 18, 2025

(54) UTILIZATION OF BIOGAS SCRUBBER IN ANAEROBIC MEMBRANE BIOREACTOR SYSTEMS

(71) Applicant: Evoqua Water Technologies Canada Ltd., Fredericton (CA)

(72) Inventors: Dwain Wilson, Fredericton (CA); Daniel Bertoldo, Fredericton (CA); Josh Snowdon, Fredericton (CA); Jonathan Dargavel, Fredericton (CA); Shannon Grant, Fredericton (CA)

(73) Assignee: Evoqua Water Technologies Canada Ltd., Fredericton (CA)

( * ) Notice: Subject to any disclaimer, the term of this patent is extended or adjusted under 35 U.S.C. 154(b) by 532 days.

(21) Appl. No.: 17/793,435

(22) PCT Filed: Jan. 18, 2021

(86) PCT No.: PCT/CA2021/050051
§ 371 (c)(1),
(2) Date: Jul. 18, 2022

(87) PCT Pub. No.: WO2021/142553
PCT Pub. Date: Jul. 22, 2021

(65) Prior Publication Data
US 2023/0038934 A1 Feb. 9, 2023

Related U.S. Application Data

(60) Provisional application No. 62/961,827, filed on Jan. 16, 2020.

(51) Int. Cl.
*B01D 53/52* (2006.01)
*B01D 53/78* (2006.01)
(Continued)

(52) U.S. Cl.
CPC ............. *B01D 53/52* (2013.01); *B01D 53/78* (2013.01); *B01D 53/84* (2013.01); *C02F 3/006* (2013.01);
(Continued)

(58) Field of Classification Search
CPC ........ B01D 53/52; B01D 53/78; B01D 53/84; B01D 2251/60; B01D 2255/20738;
(Continued)

(56) References Cited

U.S. PATENT DOCUMENTS

| 6,569,332 B2 | 5/2003 | Ainsworth et al. |
| 2006/0243661 A1 | 11/2006 | You et al. |
| 2013/0327709 A1* | 12/2013 | Stroot ................... C02F 3/2893 210/151 |

FOREIGN PATENT DOCUMENTS

| CN | 1424985 A * | 6/2003 | ............. C02F 3/286 |
| CN | 110214128 A | 9/2019 | |

(Continued)

OTHER PUBLICATIONS

Guimaraes, Barbara, "Extended European Search Report", European Patent Application No. 21740660.2, mailed Mar. 25, 2024.
(Continued)

*Primary Examiner* — Waqaas Ali

(57) ABSTRACT

Methods of controlling hydrogen sulfide concentration of a biogas occupying an anaerobic membrane bioreactor (AnMBR) containing a submerged membrane are disclosed herein. Methods of controlling dissolved sulfide concentration of a mixed liquor within the AnMBR are disclosed. The methods include directing wastewater containing sulfur and a chemical oxygen demand (COD) to an AnMBR, withdrawing at least a fraction of the biogas from the AnMBR, directing a pre-determined amount of the withdrawn biogas to a scrubber, directing a remainder of the withdrawn biogas
(Continued)

to a gas distributor, and directing the scrubbed biogas to the AnMBR. Systems for treating wastewater having sulfur and COD are disclosed. The systems include an AnMBR, a scouring gas closed loop, a scrubber, and a control mechanism for directing biogas to the scrubber and to a gas distributor. Methods of retrofitting a system for treating wastewater having sulfur and COD are disclosed.

12 Claims, 6 Drawing Sheets

(51) Int. Cl.
    *B01D 53/84*     (2006.01)
    *C02F 3/00*     (2023.01)
    *C02F 3/28*     (2023.01)
    *C12M 1/00*     (2006.01)
    *C12M 1/107*     (2006.01)
    *C12M 1/12*     (2006.01)
    *C12M 1/34*     (2006.01)
    *C02F 101/10*     (2006.01)
    *C02F 103/32*     (2006.01)
    *C02F 103/36*     (2006.01)

(52) U.S. Cl.
    CPC ............ *C02F 3/2853* (2013.01); *C12M 21/04* (2013.01); *C12M 25/02* (2013.01); *C12M 41/34* (2013.01); *C12M 47/18* (2013.01); *B01D 2251/60* (2013.01); *C02F 2101/101* (2013.01); *C02F 2103/32* (2013.01); *C02F 2103/36* (2013.01); *C02F 2209/003* (2013.01); *C02F 2209/08* (2013.01); *C02F 2209/265* (2013.01); *C02F 2209/38* (2013.01); *C02F 2303/16* (2013.01)

(58) Field of Classification Search
    CPC .......... B01D 2257/304; B01D 2258/05; B01D 53/1468; C02F 3/006; C02F 3/2853; C02F 2101/101; C02F 2103/32; C02F 2103/36; C02F 2209/003; C02F 2209/08; C02F 2209/265; C02F 2209/38; C02F 2303/16; C02F 2209/005; C02F 2209/19; C02F 2209/26; C12M 21/04; C12M 25/02; C12M 41/34; C12M 47/18; C12P 5/023; C10L 3/104; C10L 2290/26; C10L 2290/545; C10L 2290/548; C10L 2290/58; C10L 2290/60; Y02E 50/30
    See application file for complete search history.

(56) References Cited

FOREIGN PATENT DOCUMENTS

| | | | | |
|---|---|---|---|---|
| CN | 110563134 A | | 12/2019 | |
| JP | 2002079036 A | * | 3/2002 | ............. B01D 53/52 |
| WO | WO-2013185350 A1 | * | 12/2013 | ............. C02F 3/307 |
| WO | WO-2018226766 A1 | * | 12/2018 | ............. C02F 3/005 |

OTHER PUBLICATIONS

International Search Report, in corresponding PCT/CA2021/050051, dated Apr. 13, 2021.

* cited by examiner

UTILIZATION OF BIOGAS SCRUBBER IN ANAEROBIC MEMBRANE BIOREACTOR SYSTEMS

CROSS-REFERENCE TO RELATED APPLICATIONS

This application claims priority under 35 U.S.C. § 119(e) to U.S. Provisional Application Ser. No. 62/961,827, titled "Utilization of $H_2S$ Biogas Scrubber Discharge for Scour of Anaerobic Membrane Bioreactor (AnMBR) Submerged Membranes to Overcome Sulfide Toxicity" filed Jan. 16, 2020, which is incorporated herein by reference in its entirety for all purposes.

FIELD OF TECHNOLOGY

Aspects and embodiments disclosed herein are generally related to anaerobic membrane bioreactor systems, and more specifically, to utilization of biogas scrubbers in anaerobic membrane bioreactor systems.

SUMMARY

In accordance with one aspect, there is provided a method of controlling hydrogen sulfide concentration of a biogas occupying an anaerobic membrane bioreactor containing a submerged membrane. The method may comprise directing a wastewater comprising sulfur and a chemical oxygen demand (COD) to the anaerobic membrane bioreactor to produce a permeate and a biogas comprising the hydrogen sulfide. The method may comprise withdrawing at least a fraction of the biogas from a headspace of the anaerobic membrane bioreactor. The method may comprise directing a pre-determined amount of the withdrawn biogas to a scrubber to produce a scrubbed biogas having a lower concentration of the hydrogen sulfide than the biogas. The method may comprise directing a remainder of the withdrawn biogas to a gas distributor within the anaerobic membrane bioreactor to scour the membrane. The method may comprise directing the scrubbed biogas to the headspace of the anaerobic membrane bioreactor.

In some embodiments, the method may further comprise measuring the sulfur concentration and the COD of the wastewater upstream from the anaerobic membrane bioreactor.

The method may further comprise selecting the pre-determined amount of the withdrawn biogas directed to the scrubber responsive to the measurement of the sulfur concentration and the COD.

In some embodiments, the pre-determined amount of the withdrawn biogas directed to the scrubber may be between about 10% to about 50%.

In some embodiments, the wastewater may have a COD to sulfate ratio of 7:1 or less.

The method may further comprise measuring the hydrogen sulfide concentration of the biogas.

In some embodiments, the method may further comprise selecting the pre-determined amount of the withdrawn biogas directed to the scrubber responsive to the measurement of the hydrogen sulfide concentration.

The permeate may be post-treated with sulfur oxidation. In some embodiments, the method may further comprise measuring the sulfide concentration of the permeate.

The method may further comprise selecting the pre-determined amount of the withdrawn biogas directed to the scrubber responsive to the measurement of the sulfide concentration.

In accordance with another aspect, there is provided a system for treating wastewater having sulfur and a chemical oxygen demand (COD). The system may comprise an anaerobic membrane bioreactor comprising a submerged membrane and a gas distributor positioned to scour the membrane, an influent inlet fluidly connected to a source of the wastewater, a permeate outlet, a biogas outlet, and a scrubbed biogas inlet. The system may comprise a scouring gas closed loop extending between the biogas outlet and the gas distributor. The system may comprise a scrubber having an inlet fluidly connectable to the biogas outlet and an outlet fluidly connectable to the scrubbed biogas inlet. The system may comprise a control mechanism configured to direct a first portion of the biogas to the scrubber and a second portion of the biogas to the gas distributor.

In some embodiments, the control mechanism comprises a throttling valve positioned in the scouring gas closed loop.

In some embodiments, the scouring gas closed loop comprises a branch extended to the inlet of the scrubber.

The system may further comprise a wastewater sensing subsystem configured to measure the sulfur concentration and the COD of the wastewater upstream from the influent inlet.

The control mechanism may be operatively connected to the wastewater sensing subsystem and configured to direct the first and second portions of the biogas responsive to the measurement of the sulfur concentration and the COD.

The system may further comprise a biogas sensing subsystem configured to measure a hydrogen sulfide concentration of the biogas.

The control mechanism may be operatively connected to the biogas sensing subsystem and configured to direct the first and second portions of the biogas responsive to the measurement of the hydrogen sulfide concentration.

The system may further comprise a permeate sensing subsystem configured to measure a sulfide concentration of the permeate.

The control mechanism may be operatively connected to the permeate sensing subsystem and configured to direct the first and second portions of the biogas responsive to the measurement of the sulfide concentration.

In some embodiments, the scrubber may be a chemical scrubber or a biological scrubber.

The scrubber may have a scrubbing efficiency of at least 90%.

In some embodiments the submerged membrane may be a flat plate membrane or a hollow fiber membrane.

The anaerobic membrane bioreactor may have a microorganism population comprising methanogens.

In accordance with yet another aspect, there is provided a method of retrofitting a system for treatment of wastewater having sulfur and a chemical oxygen demand (COD). The system may comprise an anaerobic membrane bioreactor comprising a submerged membrane and a gas distributor positioned to scour the membrane, an influent inlet fluidly connected to a source of the wastewater, a permeate outlet, and a biogas outlet. The system may further comprise a scouring gas closed loop extending between the biogas outlet and the gas distributor. The method may comprise providing a scrubber having an inlet fluidly connectable to the biogas outlet and an outlet fluidly connectable to a scrubbed biogas inlet of the anaerobic membrane bioreactor. The method may comprise providing a control mechanism configured to direct a first portion of the biogas to the scrubber and a second portion of the biogas to the gas distributor.

In some embodiments, the method may further comprise fluidly connecting the inlet of the scrubber to a branch of the scouring gas closed loop and fluidly connecting the outlet of the scrubber to the scrubbed biogas inlet of the anaerobic membrane bioreactor.

The method may further comprise providing a wastewater sensing subsystem configured to measure the sulfur concentration and the COD of the wastewater upstream from the influent inlet.

The method may further comprise providing a biogas sensing subsystem configured to measure a hydrogen sulfide concentration of the biogas.

The method may further comprise providing a permeate sensing subsystem configured to measure a sulfide concentration of the permeate.

In some embodiments, the method may comprise programming the control mechanism to direct the first and second portion of the biogas responsive to at least one of the measured sulfur concentration of the wastewater, the measured COD of the wastewater, the measured hydrogen sulfide concentration of the biogas, and the measured sulfide concentration of the permeate.

In some embodiments, the method may comprise operatively connecting the control mechanism to at least one of the wastewater sensing subsystem, the biogas sensing subsystem, and the permeate sensing subsystem.

The disclosure contemplates all combinations of any one or more of the foregoing aspects and/or embodiments, as well as combinations with any one or more of the embodiments set forth in the detailed description and any examples.

BRIEF DESCRIPTION OF THE DRAWINGS

The accompanying drawings are not intended to be drawn to scale. In the drawings, each identical or nearly identical component that is illustrated in various figures is represented by a like numeral. For purposes of clarity, not every component may be labeled in every drawing. In the drawings.

DETAILED DESCRIPTION

Figure 1:
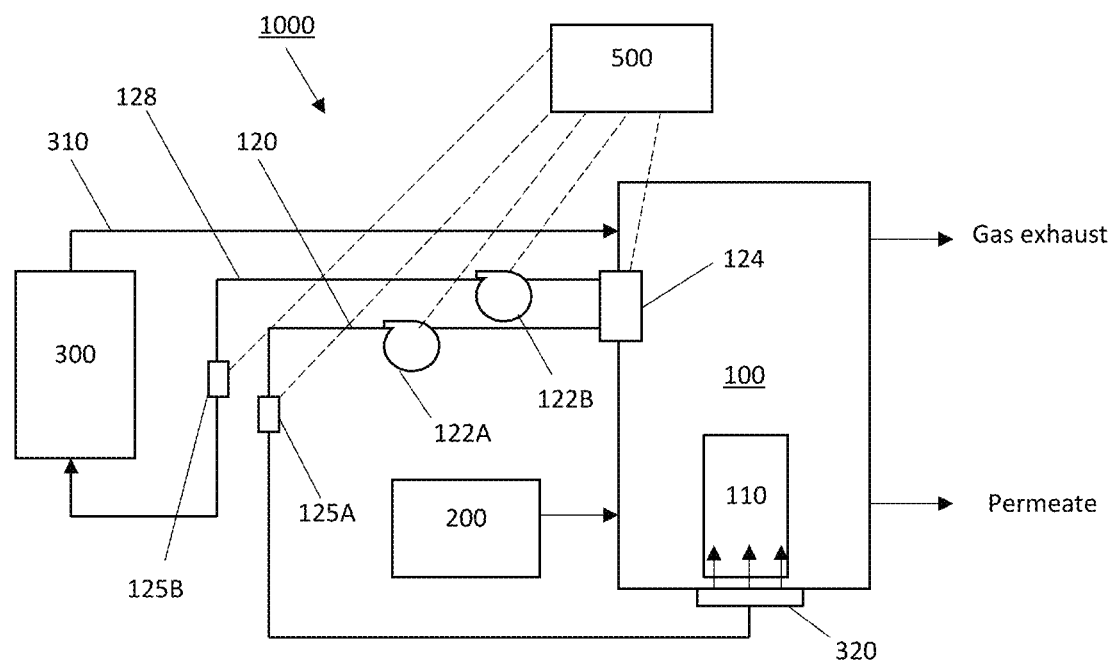
FIG. 1 is a box diagram of a system for treatment of wastewater, according to one embodiment.

The systems and methods disclosed herein relate to treatment of wastewater under anaerobic conditions. During anaerobic treatment, wastewater may be directed to a tank or reactor comprising anaerobic microorganisms. The anaerobic microorganisms convert biologically degradable material in the wastewater primarily into water and biogas. In particular, anaerobic microorganisms facilitate decomposition of macromolecular organic matter into simpler compounds and biogas by methane fermentation. Such biogas is primarily carbon dioxide and methane but may include other constituents depending on the composition of the wastewater. For example, biogas of the systems and methods disclosed herein may comprise carbon dioxide, methane, and hydrogen sulfide ($H_2S$) gas.

Anaerobic treatment may generally refer to situations in which the prevailing conditions of the water within the tank or reactor are anaerobic. The tank or reactor may be closed. The tank or reactor may be open. In particular, even in embodiments in which the anaerobic treatment tank or reactor is open, anaerobic treatment may occur in the absence of added oxygen when the prevailing conditions in the water are anaerobic.

The systems and methods disclosed herein relate to treatment of wastewater with a membrane reactor. In membrane reactors, solid-liquid separation of degrading or degraded wastewater may be performed through a membrane filter. The membrane filter may be positioned directly in the reactor. The membrane filter may be positioned in a separate tank or reactor, having an inlet fluidly connected to a process tank and an outlet fluidly connected back to the same or a different process tank. The membrane filter may generally have pores dimensioned to perform microfiltration or ultrafiltration. A flux of permeate may be drawn through the membrane filter by suction applied to an inside volume of the membrane filter.

The conditions within the membrane reactor or a reactor fluidly connected to the membrane filter, as described above, may be primarily anaerobic. That is, a membrane filter may be used to separate a permeate from wastewater treated with anaerobic microorganisms. A primarily anaerobic wastewater treatment system comprising a membrane filter may be referred to herein as an anaerobic membrane bioreactor (AnMBR).

The AnMBR is a continuous flow anaerobic biological sludge treatment system that employs a physical membrane barrier for solid-liquid separation. The AnMBR may have a long hydraulic retention time, for example, of approximately 20 days. The AnMBR may have a shorter hydraulic retention time, for example, of approximately 1-5 days. The AnMBR disclosed herein may have a hydraulic retention time of about 1 to about 30 days, for example, about 10 to about 25 days.

Anaerobic seed sludge may be provided from an active anaerobic sludge treatment system. Additional seed sludge may be provided to supplement the anaerobic biological sludge as needed or periodically. To maintain a target MLSS concentration, a portion of the reactor contents may be removed as waste anaerobic sludge (WANS). In some embodiments, the WANS may be removed daily.

Nutrients and/or alkalinity agents may be supplied to the anaerobic biological sludge, for example, nitrogen, phosphorous, sodium bicarbonate, urea, phosphoric acid, and combinations thereof. Total Kjeldahl Nitrogen (TKN) and Ammonia Nitrogen ($NH_3$—N) measurements of the raw wastewater and digested wastewater may be used to determine whether sufficient nitrogen is available for the digestion process. Phosphate phosphorous ($PO_4$—P) measurements of the raw wastewater and digested wastewater may be used to determine whether sufficient phosphorous is available for the digestion process.

The use of a membrane filter in anaerobic digestion may provide improved separation over conventional gravity clarification separation. The AnMBR systems disclosed herein may be used to treat industrial wastewater, for example, wastewater from biodiesel plants, yeast fermentation and distillery processes, food production, pharmaceutical plants, pulp mills, petrochemical refineries, and other industrial wastewater sources.

The membrane filter used in the AnMBR systems disclosed herein may be a submerged membrane. Submerged membranes may be in the form of a flat plate membrane, a hollow fiber membrane, or a multi-tube or multi-channel membrane. Biogas produced by the anaerobic digestion may be circulated within the AnMBR to scour the submerged membrane. In some embodiments, the biogas may be substantially continuously circulated to scour the submerged membrane. In some embodiments, the biogas may be periodically released to scour the membrane.

One problem faced by AnMBR operation is the presence of an undesirable amount of dissolved sulfide concentration in the mixed liquor within the AnMBR. Excessive concentrations of dissolved sulfide within the AnMBR may be toxic to the anaerobic microorganisms therein. For instance, methanogens may be particularly sensitive to sulfur. However, other anaerobic microorganisms found in the anaerobic bioreactor may also suffer from sulfur toxicity. Other exemplary anaerobic microorganisms include acetogens. Thus, it may be desirable to control concentration of dissolved sulfide in the mixed liquor.

Dissolved sulfide in the mixed liquor may be in equilibrium with hydrogen sulfide ($H_2S$) gas in the biogas produced from treatment of certain wastewaters. Hydrogen sulfide gas can be poisonous, corrosive, and flammable. For at least these reasons, it is generally desirable to control concentration of hydrogen sulfide in the produced biogas.

The systems and methods disclosed herein are concerned with controlling dissolved sulfide concentration of the mixed liquor. The systems and methods disclosed herein are concerned with removal and/or reduction of hydrogen sulfide gas in at least a portion of the biogas produced during treatment of certain wastewaters in an AnMBR. In particular, the systems and methods disclosed herein are concerned with reduction of hydrogen sulfide in a biogas circulated within the AnMBR. Some embodiments disclosed herein involve treatment of at least a portion of the biogas to be substantially free of hydrogen sulfide gas. Certain embodiments are capable of treating at least a portion of the biogas to consist or consist essentially of methane and carbon dioxide.

Methods of controlling dissolved sulfide concentration of the mixed liquor within the anaerobic membrane bioreactor are disclosed herein. Thus, in accordance with one aspect, there is provided a method of controlling hydrogen sulfide concentration of a biogas produced by anaerobic treatment of wastewater. The methods may generally be employed to control hydrogen sulfide concentration in the biogas occupying the anaerobic membrane bioreactor. In certain embodiments, the methods may be employed to control hydrogen sulfide concentration in the biogas circulated within the AnMBR, for example, biogas circulated to scour a submerged membrane within the anaerobic membrane bioreactor.

Hydrogen sulfide gas may be produced upon anaerobic digestion of certain wastewaters. In particular, anaerobic digestion of wastewater comprising sulfur and a chemical oxygen demand (COD) may produce biogas containing hydrogen sulfide. COD may refer to the concentration of organic compounds in the wastewater that can be oxidized to $CO_2$ and $H_2O$, for example, by an oxidizing agent under controlled conditions, e.g., acidic conditions. Sulfur may be present in the wastewater in the form of sulfate ($SO_4$). Sulfate is broken down in the digester to form hydrogen sulfide. Sulfur may be present in the wastewater in the form of sulfide ($S^{2-}$). Sulfide may be measured to determine possible sulfide inhibition in the digestion process. Unionized sulfur may be toxic to the anaerobic microorganisms.

The method may comprise directing a wastewater comprising sulfur and a chemical oxygen demand (COD) to the anaerobic membrane bioreactor to produce a permeate and a biogas. The wastewater to be treated may have a COD to sulfate ratio of 8:1 or less. For instance, the wastewater to be treated may have a COD to sulfate ratio of 8:1 or less, 7:1 or less, 6:1 or less, 5:1 or less, or 4:1 or less. The wastewater to be treated may have a COD to sulfate ratio of 8:1 to 4:1, of 8:1 to 6:1, or of 7:1 to 6:1.

Biogas to be treated for removal or reduction of hydrogen sulfide may be withdrawn from the headspace of the anaerobic membrane bioreactor. The biogas to be treated may have a hydrogen sulfide concentration of more than 3.0%, for example, more than 3.5%, more than 4.0%, or more than 4.5%. Thus, the method may comprise withdrawing at least a fraction of the biogas from the headspace of the anaerobic membrane bioreactor. The method may comprise treating at least a portion of the withdrawn biogas for removal of hydrogen sulfide gas with a scrubber to produce a scrubbed biogas having a lower concentration of hydrogen sulfide than the biogas within the anaerobic membrane bioreactor. The method may further comprise directing the scrubbed biogas to the headspace of the anaerobic membrane bioreactor, for example, to be combined with biogas therein. The combination of gases may be effective to reduce hydrogen sulfide concentration of the biogas within the anaerobic membrane bioreactor. The target hydrogen sulfide composition of the biogas may be less than 4.5%, for example, less than 4.0%, less than 3.5%, less than 3.0%, less than 2.5%, less than 2.0%, or less than 1.5%. In some embodiments, the biogas may be treated to have a hydrogen sulfide composition of about 1.0% to 3.0%. The remainder of the biogas may be primarily carbon dioxide and methane.

The scrubber may be a chemical scrubber or a biological scrubber. Exemplary chemical scrubbers may utilize ferric chloride or activated carbon to capture hydrogen sulfide gas. Exemplary biological scrubbers may employ sulfur-oxidizing bacteria. For instance, the biological scrubber may be configured to contact the biogas with an anaerobic biological sludge effective to capture sulfide. The captured sulfide may then be oxidized with sulfur-oxidizing bacteria. The chemical or biological scrubber may have an efficiency of at least 90%, for example, at least 95%, at least 98%, at least 99%, at least 99.9%, or at least 99.99%.

The methods disclosed herein may be effective to remove at least 90% of dissolved sulfide from the wastewater. For example, the methods may produce a permeate having at least 90%, at least 80%, at least 70%, at least 60%, at least 50%, at least 40%, or at least 30% less sulfide than the influent wastewater. In exemplary embodiments, the permeate may have less than 700 mg/l sulfide, for example, less than 600 mg/l, less than 500 mg/l, less than 400 mg/l, less than 300 mg/l, or less than 200 mg/l sulfide.

The methods disclosed herein may be employed to control concentration of hydrogen sulfide in the biogas within the anaerobic membrane bioreactor, for example, to be within a desired concentration range. The method may comprise selecting a pre-determined amount of biogas to be directed to the scrubber. The pre-determined amount to be directed to the scrubber may be controlled, for example, with a pump and/or flow meter. In particular, a selected volume of hydrogen sulfide gas may be scrubbed by controlling flow rate of the biogas through the scrubber. Thus, hydrogen sulfide concentration within the bioreactor may be controlled by controlling flow rate of the biogas through the scrubber.

The pre-determined amount of biogas to be directed to the scrubber may be selected based on discharge requirements for biogas exhaust from the system. In some embodiments, the methods disclosed herein may be effective to produce a biogas having less than 4.5% hydrogen sulfide. For example, the pre-determined amount of biogas may be selected to produce a biogas having less than 4.5% hydrogen sulfide, less than 4.0% hydrogen sulfide, less than 3.5% hydrogen sulfide, less than 3.0% hydrogen sulfide, less than 2.5% hydrogen sulfide, less than 2.0% hydrogen sulfide, or less than 1.5% hydrogen sulfide. The biogas may additionally comprise or be made up of carbon dioxide and methane.

The pre-determined amount of biogas to be directed to the scrubber may be selected based on toxicity to a target anaerobic microorganism. For instance, the pre-determined amount of biogas to be directed to the scrubber may be selected to control dissolved sulfide within the AnMBR to be below a threshold concentration which would be toxic to a target anaerobic microorganism. As previously described, methanogens may be particularly susceptible to sulfur toxicity. Thus, maintaining the hydrogen sulfide concentration of the biogas below a threshold concentration toxic to methanogens may be effective to maintain viability of other anaerobic microorganisms as well. An un-ionized sulfur concentration greater than 100 mg/L or 150 mg/L in the digested wastewater may be toxic to anaerobic microorganisms. Thus, the methods may comprise controlling un-ionized sulfur in the mixed liquor to be below 150 mg/L, for example, below 100 mg/L.

In some embodiments, the method may comprise circulating biogas from the headspace of the AnMBR to a gas distributor to scour the membrane. Scouring is a method of controlling membrane fouling in a submerged membrane bioreactor. Membrane scouring may include gas distribution over the membrane submerged in the digested wastewater, for example, with recirculated biogas. The membrane may be substantially continuously scoured. The membrane may be scoured periodically. The method may comprise supplementing the biogas with an external gas source. In some embodiments, membrane scouring may include addition of scouring media to further reduce a rate of fouling of the membrane.

The scoured biogas may additionally capture sulfide from the digested solution within the bioreactor to reduce or remove sulfide toxicity. The sulfide capture with biogas removes sulfur from the mixed liquor within the AnMBR, with the captured sulfur being transferred to the headspace and further reduced or removed with the scrubber. The combination of sulfur capture from the liquid and removal from the biogas may have a synergistic effect in reducing sulfur toxicity within the bioreactor and producing a permeate with a low sulfide concentration. In some embodiments, the permeate may meet sulfide discharge requirements.

In some embodiments, the biogas directed to the scrubber and the biogas directed to scour the membrane may be drawn through independent gas outlets. The flow of biogas through the independent gas outlets may be independently controlled. In other embodiments, biogas directed to the scrubber and the biogas directed to scour the membrane may be withdrawn through a common outlet. A portion of the withdrawn biogas may be directed to the scrubber, while a remainder of the withdrawn biogas may be directed to scour the membrane. In accordance with certain exemplary embodiments, the pre-determined fraction of the withdrawn biogas directed to the scrubber may be between about 1% and about 100%. For example, the pre-determined fraction of the withdrawn biogas directed to the scrubber may be between about 5% and about 75%, between about 10% and about 50%, between about 15% and about 35%, or between about 20% and about 30%.

The method may comprise selecting the pre-determined amount of the biogas to be directed to each of the scrubber and the gas distributor to scour the membrane. The pre-determined amount or fraction may be selected based on viability of the target anaerobic microorganism and/or discharge requirements of the biogas. The pre-determined amount or fraction may be selected responsive to a measurement or determination of composition of the wastewater, composition of the biogas, composition of the permeate, and flowrate of biogas out of the reactor. The pre-determined amount or fraction of the withdrawn biogas directed to the scrubber may be selected to maintain unionized sulfur concentration of the mixed liquor within the bioreactor below 150 mg/L, for example, below 100 mg/L.

In some embodiments, the pre-determined amount or fraction of the withdrawn biogas directed to the scrubber may be selected responsive to a measured parameter. Thus, the method may comprise measuring one or more parameter of the wastewater, biogas, or permeate.

The methods disclosed herein may comprise measuring composition of the wastewater. For instance, the method may comprise measuring the sulfur concentration and the COD of the wastewater prior to treatment, for example, upstream from the anaerobic membrane bioreactor. The threshold COD to sulfate ratio may be 8:1, 7:1, 6:1, 5:1, or 4:1. The method may comprise selecting the pre-determined amount of the biogas directed to the scrubber responsive to the measurement of the composition of the wastewater. In general, a greater amount of biogas may be directed to the scrubber responsive to the wastewater having a lower COD to sulfate ratio.

The methods may comprise measuring composition of the biogas. For instance, the method may comprise measuring hydrogen sulfide concentration of the biogas, for example, within the anaerobic membrane bioreactor or downstream from a gas exhaust of the anaerobic membrane bioreactor. The threshold hydrogen sulfide concentration in the biogas may be 4.5%, 4.0%, 3.5%, 3.0%, 2.5%, 2.0%, or 1.5%. The method may comprise selecting the pre-determined amount of biogas directed to the scrubber responsive to the measurement of the composition of the biogas. In general, a greater amount of biogas may be directed to the scrubber responsive to the biogas having a greater hydrogen sulfide concentration.

The method may comprise measuring composition of the permeate. For instance, the method may comprise measuring sulfide concentration of the permeate, for example, downstream from the anaerobic membrane bioreactor. The threshold sulfide concentration in the permeate may be 700 mg/l, for example, 600 mg/l, 500 mg/l, 400 mg/l, 300 mg/l, or 200 mg/l. The method may comprise selecting the pre-determined amount of biogas directed to the scrubber responsive to the measurement of the composition of the permeate. In general, a greater amount of biogas may be directed to the scrubber responsive to the permeate having a greater sulfide concentration.

Thus, the methods may comprise selecting the pre-determined amount of the biogas to be directed to the scrubber, for example, by selecting the fraction of withdrawn biogas to be directed to the scrubber or controlling flow rate of the biogas directed to the scrubber, responsive to the measurement of one or more of parameter, namely, composition of the wastewater, composition of the biogas, and/or composition of the permeate.

The method may comprise post-treating the permeate, for example, to meet discharge requirements. The permeate may be post-treated with sulfur oxidation. In some embodiments, the post-treatment may remove at least 60%, at least 50%, at least 40%, or at least 30% of the sulfide from the permeate. The post-treated permeate may have less than 300 mg/l sulfide, for example, less than 250 mg/l, less than 200 mg/l, less than 150 mg/l, or less than 100 mg/l sulfide. The post-treated permeate may have less than 99%, less than 95%, less than 90%, less than 80%, or less than 70% sulfide than the incoming wastewater.

In accordance with another aspect, there is provided a system for treating wastewater. The system may be configured to treat wastewater having sulfur and a chemical oxygen demand (COD), as previously described. The system may comprise an anaerobic membrane bioreactor configured to treat the wastewater by anaerobic digestion. Thus, the anaerobic membrane bioreactor may comprise an inlet fluidly connectable to a source of the wastewater. In use, the anaerobic membrane bioreactor inlet may be fluidly connected to the source of the wastewater.

The source of the wastewater may be an industrial wastewater, as previously described. In some embodiments, the wastewater may be pre-treated prior to delivery to the anaerobic membrane bioreactor. The wastewater may be directed to a pre-treatment subsystem, for example, a dissolved air flotation system, an anaerobic continuous stirred tank reactor (CSTR).

In some embodiments, the source of the wastewater may include or be connected to a source of nutrients for the anaerobic microorganisms, for example, a source of nitrogen, phosphorous, sodium bicarbonate, urea, and/or phosphoric acid.

The anaerobic membrane bioreactor may be sized to hold 500,000 gal (189,270 L) to 10,000,000 gal (37,854,117 L) of wastewater. In some embodiments, the anaerobic membrane bioreactor may be sized to hold 500,000 gal (189,270 L) to 1,000,000 gal (3,785,411 L) of wastewater, 1,000,000 gal (3,785,411 L) to 2,000,000 gal (7,570,823 L) of wastewater, 2,000,000 gal (7,570,823 L) to 5,000,000 gal (18,927,059 L) of wastewater, or 5,000,000 gal (18,927,059 L) to 10,000,000 gal (37,854,117 L) of wastewater. The anaerobic membrane bioreactor may be operated at a flow rate of between about 50,000 gpd (189,270 L/day) to 500,000 gpd (1,892,706 L/day), for example, between about 50,000 gpd (189,270 L/day) to 100,000 gpd (378,541 L/day), between about 100,000 gpd (378,541 L/day) to 250,000 gpd (946,353 L/day), or between about 250,000 gpd (946,353 L/day) to 500,000 gpd (1,892,706 L/day).

The anaerobic membrane bioreactor may house a population of anaerobic microorganisms effective to digest organic contaminants of the wastewater and produce digested wastewater and biogas. The anaerobic membrane bioreactor may comprise a membrane filter positioned to perform solid-liquid separation of the digested wastewater. The membrane filter may be a submerged membrane. The membrane filter may be a flat plate, hollow tube, or multi-tube or multi-channel membrane. The anaerobic membrane bioreactor may be constructed and arranged to draw a permeate through the submerged membrane to a permeate outlet of the bioreactor. In some embodiments, the membrane may be configured to provide substantially absolute biomass retention within the bioreactor.

The anaerobic membrane bioreactor may comprise a gas distributor positioned to scour the membrane. The gas distributor may be fluidly connected to the headspace of the anaerobic membrane bioreactor and configured to disperse the biogas stream substantially evenly over the submerged membrane, reducing the rate of fouling. The gas distributor may be configured to operate substantially continuously during operation of the system. In other embodiments, the gas distributor may be configured to operate periodically or responsive to a measurement, for example, measured differential pressure across the membrane. In some embodiments, the gas distributor may be fluidly connected to a source of an external gas stream. In some embodiments, the gas distributor may be fluidly connected to a scouring media.

The system may comprise a scouring gas closed loop extending between a biogas outlet of the reactor and the gas distributor. The scouring gas closed loop may be configured to direct biogas from the headspace of the anaerobic membrane bioreactor to the gas distributor, to be dispersed over the submerged membrane. The system may comprise a pump configured to direct the biogas through the scouring gas closed loop. In some embodiments, the system may comprise a flow meter configured to measure or control flow rate of the biogas through the scouring gas closed loop.

The system may comprise a scrubber configured to remove hydrogen sulfide gas from the biogas. The scrubber may have an inlet and an outlet. The scrubber may be fluidly connectable to a biogas outlet of the reactor. In use, the scrubber may be fluidly connected to a biogas outlet of the reactor. The scrubber may be fluidly connectable to a scrubbed biogas inlet of the reactor. In use, the scrubber may be fluidly connected to a scrubbed biogas inlet of the reactor. Thus, the scrubber may be positioned to scrub biogas from a headspace of the reactor and return the scrubbed biogas to the headspace of the reactor. The system may comprise a pump configured to direct the biogas to the scrubber. In some embodiments, the scouring gas closed loop may comprise a branch extending to the inlet of the scrubber for directing the biogas.

The system may comprise a control mechanism configured to selectively direct a portion of the biogas to the scrubber and a portion of the biogas to the gas distributor. The control mechanism may comprise a valve, set of valves, or other mechanical actuation fluidly connecting the scrubber and the gas distributor to a biogas outlet of the anaerobic membrane bioreactor. In some embodiments, the control mechanism may comprise a throttling valve, pneumatic valve, solenoid switch, or other mechanical actuation fluidly connecting each of the scrubber and the gas distributor to a biogas outlet of the anaerobic membrane bioreactor. In some embodiments, the control mechanism may comprise one or more pumps configured to direct biogas to one or more of the scrubber and the gas distributor. In certain embodiments, one or more of the throttling valve, valve or set of valves, mechanical actuation, or one or more pumps may be operatively connected to a controller. The controller may be configured to actuate the control mechanism to selectively direct the portion of the biogas to the scrubber and the gas distributor.

The system may comprise a wastewater sensing subsystem configured to measure one or more parameter of the wastewater. In certain embodiments, the wastewater sensing subsystem may be configured to measure composition of the wastewater, for example, upstream from the anaerobic membrane bioreactor. The wastewater sensing subsystem may comprise a liquid composition analyzer. For example, the wastewater sensing subsystem maybe configured to measure sulfur concentration and/or COD of the wastewater upstream from the bioreactor influent inlet. The wastewater sensing subsystem may comprise a temperature and/or pH sensor.

The system may comprise a biogas sensing subsystem configured to measure one or more parameter of the biogas. The biogas sensing subsystem may be positioned to measure a parameter of the biogas within the headspace of the bioreactor. The biogas sensing subsystem may be positioned to measure a parameter of the biogas upstream from the scrubber. The biogas sensing subsystem may be positioned to measure a parameter of the biogas downstream from the scrubber. The biogas sensing subsystem may be positioned to measure a parameter of the biogas downstream from an exhaust outlet of the bioreactor. In certain embodiments, the biogas sensing subsystem may be configured to measure composition of the biogas. The biogas sensing subsystem may comprise a gas analyzer. For example, the biogas sensing subsystem maybe configured to measure hydrogen sulfide concentration of the biogas. The biogas sensing subsystem may comprise a temperature and/or humidity sensor.

The system may comprise a permeate sensing subsystem configured to measure one or more parameter of the permeate. In certain embodiments, the permeate sensing subsystem may be configured to measure composition of the permeate, for example, downstream from the anaerobic membrane bioreactor. The permeate sensing subsystem may comprise a liquid composition analyzer. For example, the permeate sensing subsystem maybe configured to measure sulfide concentration of the permeate downstream from the bioreactor influent inlet. The permeate sensing subsystem may comprise a temperature and/or pH sensor.

The control mechanism may be operatively connected to one or more of the wastewater sensing subsystem, the biogas sensing subsystem, and the permeate sensing subsystem. The control mechanism may be configured to direct the biogas to the scrubber and/or to the gas distributor responsive to the measurement obtained from the sensing subsystem, for example, responsive to a measurement of sulfur concentration and COD in the wastewater, a measurement of hydrogen sulfide concentration in the biogas, and/or a measurement of sulfide in the permeate. In certain embodiments, the control mechanism may be configured to selectively divert a first fraction of the biogas to the scrubber and a second fraction of the biogas to the gas distributor responsive to the measurement.

In some embodiments, the system may comprise a controller. The controller may be operatively connected to the control mechanism. The controller may be operatively connected to one or more of the wastewater sensing subsystem, the biogas sensing subsystem, and the permeate sensing subsystem. The controller may be configured to instruct the control mechanism responsive to an obtained measurement.

The controller may be a computer or mobile device. The controller may comprise a touch pad or other operating interface. For example, the controller may be operated through a keyboard, touch screen, track pad, and/or mouse. The controller may be configured to run software on an operating system known to one of ordinary skill in the art. The controller may be electrically connected to a power source. The controller may be digitally connected to the one or more components. The controller may be connected to the one or more components through a wireless connection. For example, the controller may be connected through wireless local area networking (WLAN) or short-wavelength ultra-high frequency (UHF) radio waves. The controller may further be operably connected to any additional pump or valve within the system, for example, to enable the controller to direct fluids or additives as needed. The controller may be coupled to a memory storing device or cloud-based memory storage.

Multiple controllers may be programmed to work together to operate the system. For example, a controller may be programmed to work with an external computing device. In some embodiments, the controller and computing device may be integrated. In other embodiments, one or more of the processes disclosed herein may be manually or semi-automatically executed.

The system may comprise a temperature sensor. The temperature sensor may be positioned to measure temperature of the wastewater, permeate, or a mixed liquor within the anaerobic membrane bioreactor. The system may comprise a temperature control mechanism. The temperature control mechanism may comprise a heater and/or chiller. In certain embodiments, the methods disclosed herein and temperature control mechanism may be configured to maintain a suitable temperature for viability of the anaerobic microorganisms. The temperature may be controlled to be between about 50° F. (about 10° C.) and about 150° F. (about 65° C.), for example, between about 70° F. (about 21° C.) and about 100° F. (about 37° C.

The system may comprise a pH sensor. The pH sensor may be configured to measure pH of the wastewater, permeate, or a mixed liquor within the anaerobic membrane bioreactor. The system may comprise a pH control mechanism. The pH control mechanism may comprise a source of an acid and/or a source of a base. In certain embodiments, the methods disclosed herein and pH control mechanism may be configured to maintain a suitable pH for viability of the anaerobic microorganisms. The pH may be controlled to be between about 6 and about 7, for example, between about 6.5 and about 7.5.

The anaerobic membrane bioreactor system disclosed herein may be used for treatment of wastewater or may incorporated in a larger wastewater treatment system. In some embodiments, a permeate post-treatment system may be fluidly connected downstream from the permeate outlet. The permeate post-treatment system may include a sulfide oxidation tank. In some embodiments, a gas treatment system may be fluidly connected downstream from the biogas exhaust outlet. The biogas may be collected, transmitted elsewhere, and/or flared. The biogas may be post-treated with one or more additional scrubbers and/or water trap prior to release into the atmosphere. In some embodiments, anaerobic effluent may be treated by sulfide oxidation. In some embodiments, waste sludge may be treated in a dewatering system.

The system may comprise additional valves or pumps as needed to direct the one or more fluids, as disclosed herein.

Referring to FIG. 1, the wastewater treatment system 1000 may comprise an anaerobic membrane bioreactor 100 having a membrane 110 and a gas distributor 320. The anaerobic membrane bioreactor 100 may be fluidly connected to a source of wastewater 200 having a concentration of sulfur and a COD. The wastewater treatment system 1000 may have a scouring gas closed loop 120 extending between the headspace of the anaerobic membrane bioreactor 100 and the gas distributor 320. The system may have a scrubber 300 having an inlet fluidly connected to the anaerobic membrane bioreactor 100 through line 128 and an outlet fluidly connected back to the anaerobic membrane bioreactor 100 through line 310. The system 1000 may comprise control mechanism 124 configured to direct the biogas to the scrubber 300 or the gas distributor 320. The system 1000 may utilize pumps 122A, 122B and flow meters 125A, 125B to direct the biogas to the scrubber 300 and the gas distributor 320. Pumps 122A, 122B and flow meters 125A, 125B may be operatively connected to the control mechanism 124 and/or to an external controller 500.

Figure 2A:
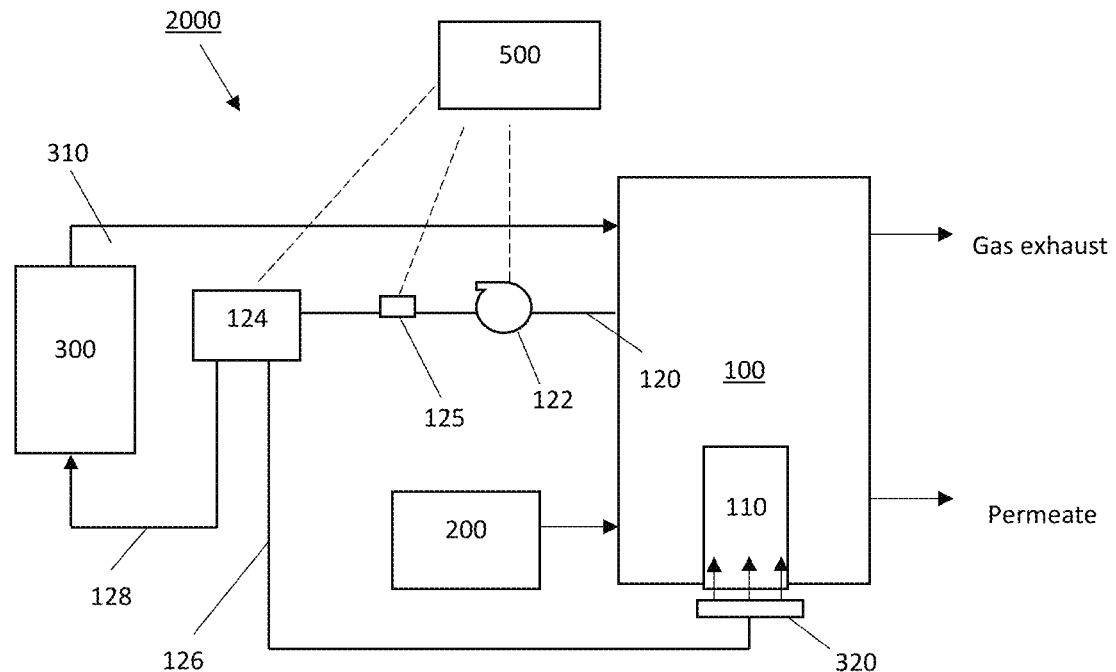
FIG. 2A is a box diagram of a system for treatment of wastewater, according to one embodiment.

Referring to FIG. 2A, the exemplary wastewater treatment system 2000 is similar to system 1000 shown in FIG. 1, except that the scouring gas closed loop 120 is split into a branch 128 directed to the scrubber 300 and a branch 126 directed to gas distributor 320. In the system 2000, control mechanism 124 may comprise a throttling valve, pneumatic valve, or solenoid switch. A single pump 122 and flow meter 125 positioned along any of the biogas lines (shown in FIG. 2A upstream from the branches 126, 128) may drive the biogas to the scrubber 300 and the gas distributor 320.

Figure 2B:
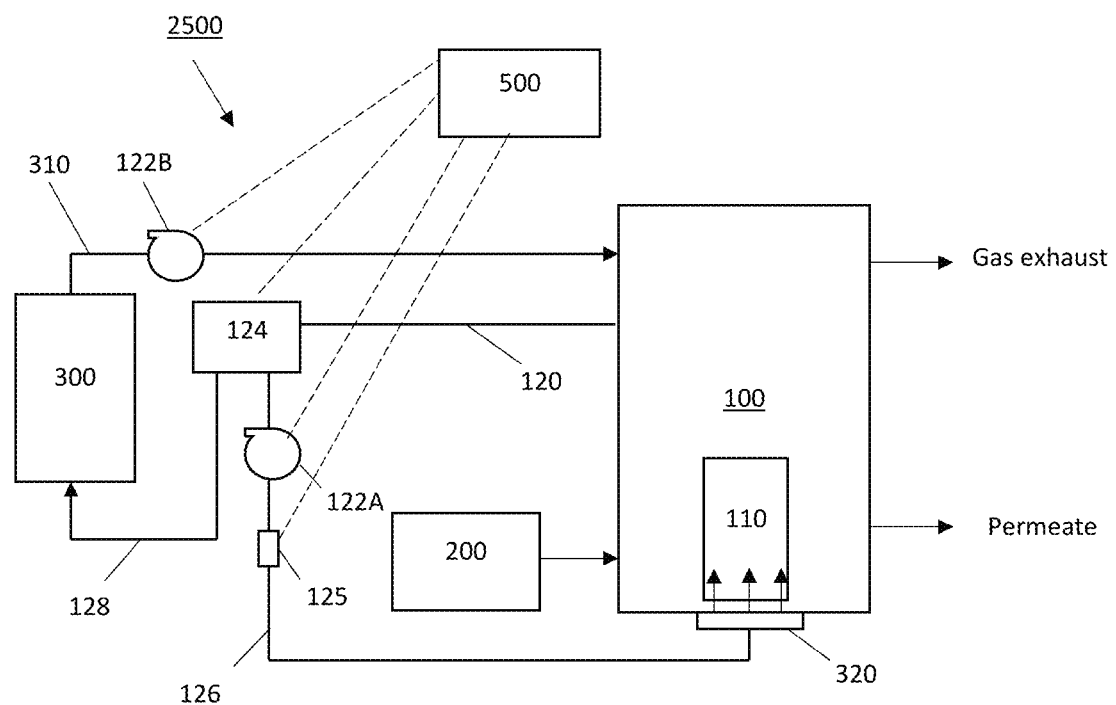
FIG. 2B is a box diagram of a system for treatment of wastewater, according to one embodiment.

Referring to FIG. 2B, the exemplary wastewater system 2500 is similar to system 2000 shown in FIG. 2A, except that system 2500 includes pump 122A positioned on branch 126 downstream from control mechanism 124 and pump 122B positioned on line 310 downstream from scrubber 300. Pump 122B may alternatively be positioned on branch 128. Flow meter 125 is positioned downstream from pump 122A. However, an alternative or additional flow meter may be positioned on branch 128 or line 310. In the embodiment of system 2500, pump 122A may be operated to direct biogas from the headspace of the bioreactor 100 to the gas distributor 320, pump 122B may be operated to circulate biogas from the headspace of the bioreactor 100 through the scrubber 300.

Figure 3:
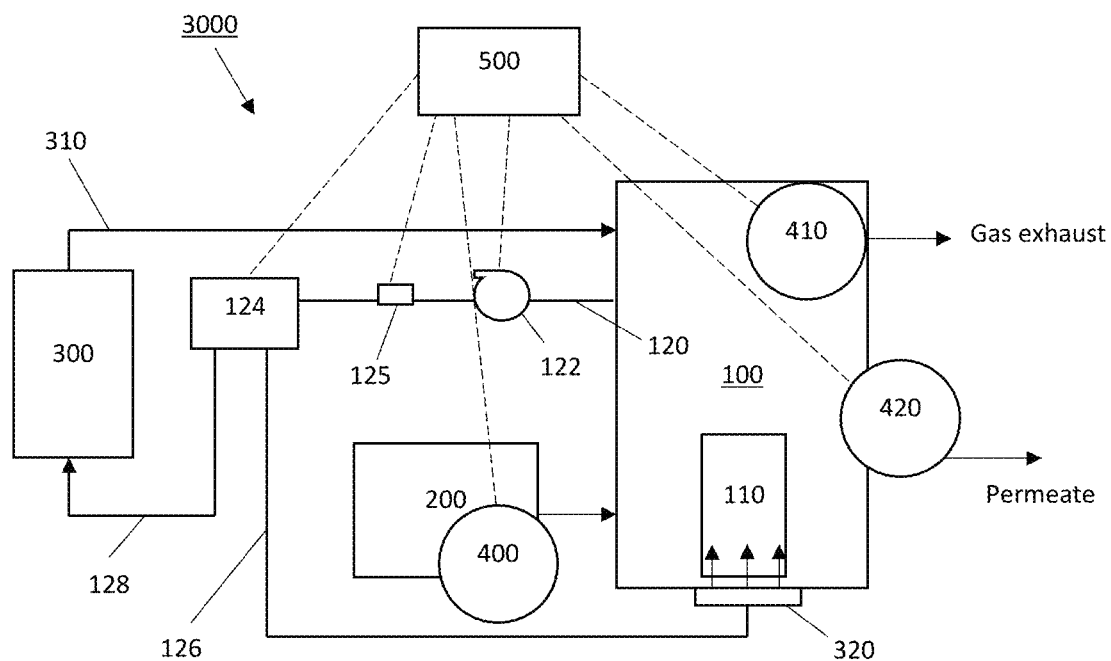
FIG. 3 is a box diagram of a system for treatment of wastewater, according to one embodiment.

Referring to FIG. 3, the exemplary wastewater treatment system 3000 is similar to system 2000 shown in FIG. 2A, except that it further includes wastewater sensing subsystem 400, biogas sensing subsystem 410, and permeate sensing subsystem 420. The sensing subsystems 400, 410, 420 may be operatively connected to control mechanism 124 and/or to controller 500. The sensing subsystems 400, 410, 420 may be included in an embodiment of the system as shown in FIG. 1 (system 1000).

Figure 4:
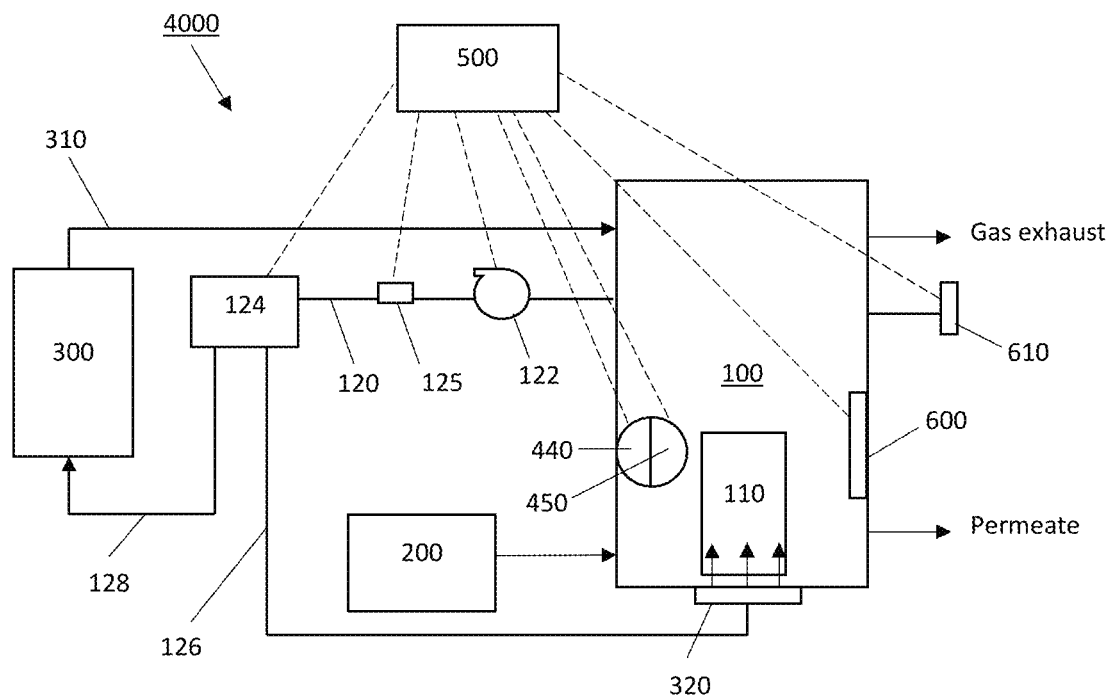
FIG. 4 is a box diagram of a system for treatment of wastewater, according to one embodiment.

Referring to FIG. 4, the exemplary wastewater treatment system 4000 is similar to system 2000 shown in FIG. 2A, except that it further includes a temperature sensor 440 and pH sensor 450. The sensors 440, 450 may be operatively connected to controller 500. The sensors 440, 450 may be operatively connected to a temperature control mechanism 600 and a pH control mechanism 610, respectively. The sensors 440, 450 may be included in an embodiment of the system as shown in FIG. 1 (system 1000) or FIG. 3 (system 3000).

Methods of retrofitting a system for treatment of wastewater are disclosed herein. The methods may be employed to retrofit a system comprising an anaerobic membrane bioreactor having a submerged membrane. In some embodiments, the method may comprise providing anaerobic seed sludge to a bioreactor. The method may comprise providing a gas distributor. The method may comprise providing instructions to install the gas distributor to scour the membrane. The methods may comprise providing instructions to fluidly connect the gas distributor to a line providing biogas from the headspace of the anaerobic membrane bioreactor. The method may comprise providing a scrubber configured to capture hydrogen sulfide gas. The method may comprise providing instructions to fluidly connect the scrubber to a line providing biogas from the headspace of the anaerobic membrane bioreactor. The method may comprise providing instructions to fluidly connect an outlet of the scrubber to the anaerobic membrane bioreactor. In some embodiments, the method may comprise providing instructions to fluidly connect the scrubber to a branch of the scouring gas closed loop.

The method may comprise providing a control mechanism configured to direct the biogas to the scrubber and the gas distributor. The method may comprise providing instructions to install the control mechanism.

The method may comprise providing one or more sensor, for example, a wastewater sensing subsystem, a biogas sensing subsystem, a permeate sensing subsystem, a temperature sensor, and/or a pH sensor. In some embodiments, the method may comprise providing instructions to operatively connect the control mechanism to one more sensor. In some embodiments, the method may comprise programming the control mechanism to operate responsive to a measurement obtained from one or more sensor.

EXAMPLES

The function and advantages of these and other embodiments can be better understood from the following examples. These examples are intended to be illustrative in nature and are not considered to be limiting the scope of the invention.

Example 1: Pilot Plant Study

Figure 5:
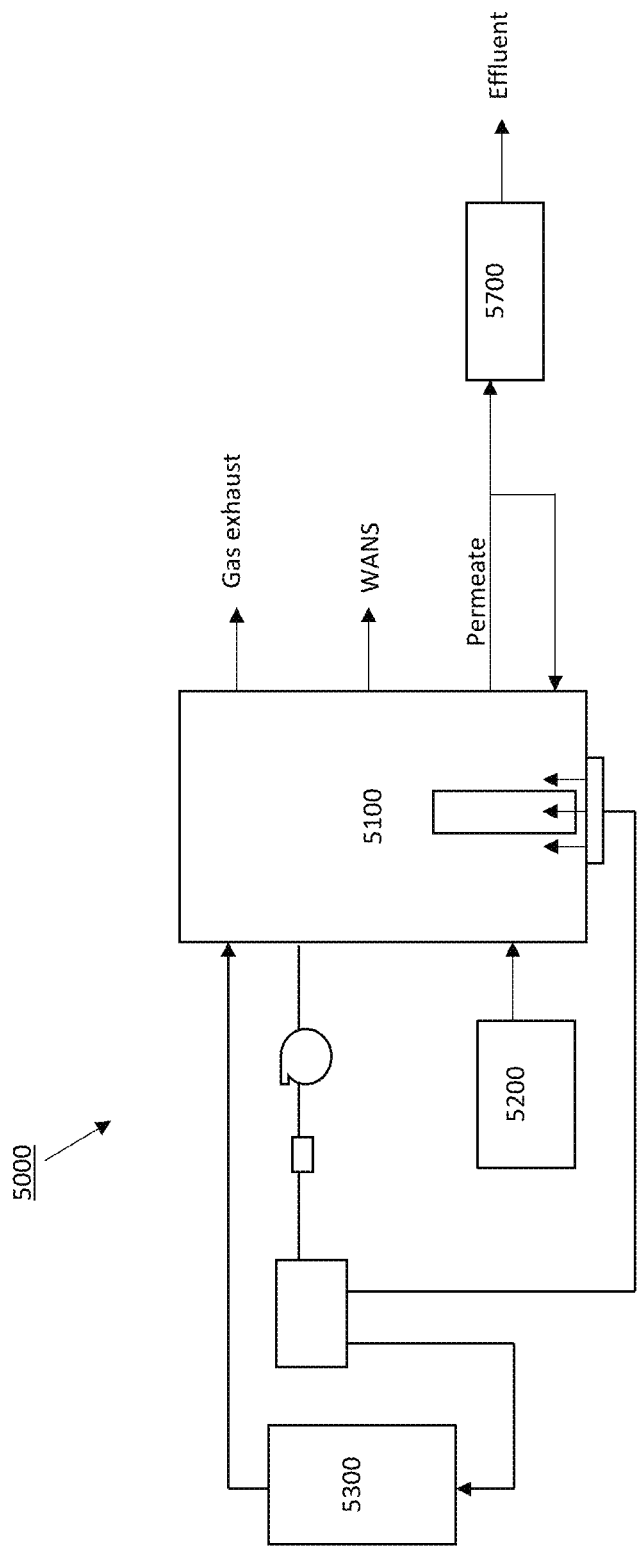
FIG. 5 is a box diagram of a system for treatment of wastewater, according to one embodiment.

A pilot system employing the methods disclosed herein was set up at a biodiesel plant. A box diagram of the pilot system is shown in FIG. 5. The pilot system 5000 included a stainless steel anaerobic membrane bioreactor tank 5100 having a volume of 345 gal (1,306 L), a wastewater mixing/holding tank 5200 having a volume of 100 gal (378.5 L), a sulfur oxidation tank 5700 having a volume of 13 gal (49 L), a biogas scrubber 5300 having a volume of 50 gal (189 L), and ancillary equipment including pumps, controls, and valves.

The pilot system treated approximately 25 gpd of biodiesel production wastewater. The wastewater was manipulated to simulate actual conditions.

A start-up/wastewater ramp up period was performed before beginning treatment to provide the anaerobic biomass time to acclimate to the biodiesel production water. Initial anaerobic seed sludge was provided from an active anaerobic digester treating food production wastewater. Additional seed sludge from a yeast distiller plant was used later in the study to boost pilot performance.

The anaerobic membrane bioreactor operated at a temperature of about 36±2° C. The influent for the AnMBR pilot was fed on a semi-continuous basis regulated by level control in the AnMBR tank. During certain periods of operation, alkalinity and macronutrients (nitrogen and phosphorous) were added to the influent wastewater by mixing bulk chemicals with the influent stored in the holding tank, upstream from the AnMBR tank. Sodium bicarbonate, urea, and phosphoric acid were made available onsite and added to the pilot, as required.

A slipstream of the permeate recycle flow was removed from the system on a daily basis as effluent. The total volume of daily AnMBR effluent was taken as the difference between the daily influent flow rate and the daily waste anaerobic sludge (WANS) flow rate. The AnMBR effluent was pumped into the sulfur oxidation tank, where it was aerated before flowing by gravity into the final effluent tote. The WANS flow rate was adjusted to maintain the AnMBR pilot system at a target mixed-liquor suspended solids (MLSS) concentration.

Through the anaerobic process, biogas was continuously generated. The continuous biogas scour served to control the sludge cake layer on the surfaces of the membranes. A variable frequency drive (VFD) on the scour blower and variable-area flow meter allowed the operator to manually dial in the scour flow to the target range.

A portion of the biogas utilized for membrane scour was forced to flow into the ferric chloride biogas scrubber drum, which was used to remove $H_2S$ from the biogas. Biogas entering the scrubber drum flowed through a fine bubble diffuser in the base of the scrubber and then flowed back into the membrane tank headspace.

Excess biogas produced in the AnMBR pilot system was discharged to the atmosphere after passing through a biogas bag and 0.5 inch (1.27 cm) biogas water trap. The biogas was characterized at regular intervals for oxygen, methane, carbon dioxide, and hydrogen sulfide concentrations.

Results
Chemical Oxygen Demand (COD)

Over the length of the study, the AnMBR pilot exhibited very high COD removal efficiencies, with an average AnMBR COD removal efficiency of 94.0%, and a minimum of 79.2% during an upset period. Post-treating the permeate with sulfur oxidation improved the total COD removal efficiency to 96.2%, with a minimum of 90.4% one day. The AnMBR effluent contained sulfide (average of 229 mg/l), while the sulfur oxidation tank effectively removed nearly all sulfide dissolved in solution from the final effluent (average of 0.2 mg/l).

Biological Oxygen Demand (BOD)

The average AnMBR BOD removal efficiency was 92.2%, with a minimum of 72.7% during an upset period. Post-treating the permeate with sulfur oxidation improved the total BOD removal efficiency to 96.9%, with a minimum of 92.0% one day. The pilot system was able to effectively maintain a final discharge BOD concentration of less than 300 mg/l, successfully meeting the permitted requirement.

Total Suspended Solids (TSS)

During the study, the AnMBR effluent TSS had a maximum value of 1.0 mg/l, leading to an average TSS removal efficiency of 99.95%. When the sulfur oxidation tank was installed, due to aerobic bacteria growth and its associated wash-out from the sulfur oxidation tank, the final effluent TSS quality declined relative to the AnMBR effluent alone. However, the average sulfur oxidation tank effluent TSS was 77 mg/l, with a maximum of 348 mg/l. Thus, throughout the entirety of the study, the pilot system generated final effluent that met the surcharge limit of 350 mg/l.

Biogas Generation and Composition

Figure 6A:
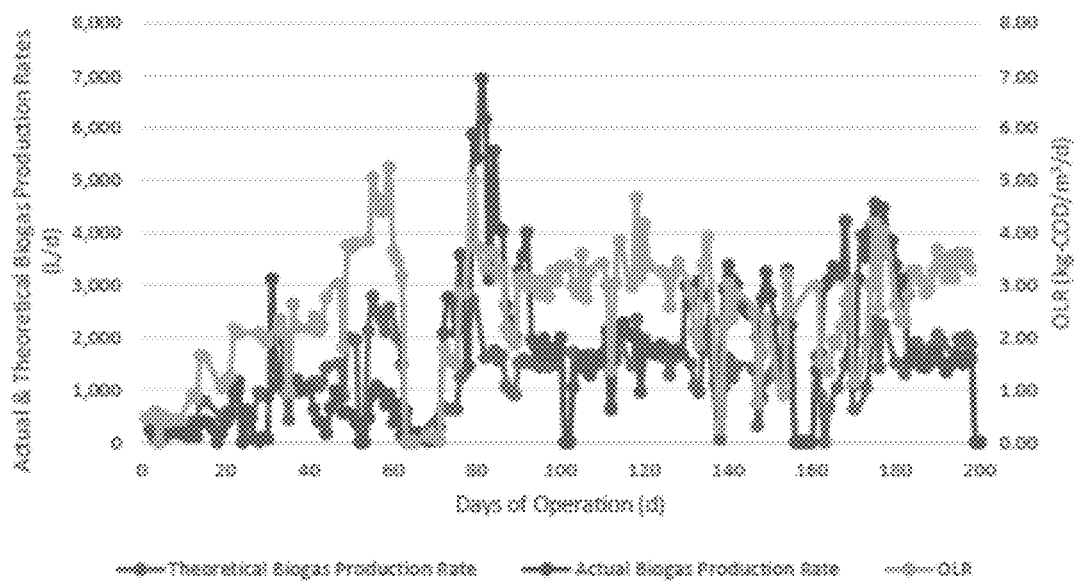
FIG. 6A is a graph of biogas production during a pilot study, according to one embodiment.

Throughout the duration of the pilot study, excess biogas generated through the anaerobic digestion process exited the pilot reactor through a biogas outflow line. A flow meter in this line measured the instantaneous biogas flow rate through the line and totalized the instantaneous measured quantities to calculate an actual daily biogas production rate. Under standard, ideal mesophilic conditions (an operating temperature of 97° F.) anaerobic biomass can produce a theoretically maximum methane yield of 0.395 $m^3$-$CH_4$/kg-COD-consumed. However, realistically, the maximum theoretical yield is not reached due to experimental losses, because some COD is consumed by sulfur reducing bacteria, which compete with the methane producing bacteria for substrate utilization, and some COD is consumed for cell reproduction. Using experimental data collected early-on in the study, a yield of 0.27 $m^3$-$CH_4$/kg-COD consumed was approximated. Using this yield and knowing the approximate concentrations of COD fed into the pilot reactor and exiting the pilot reactor, daily theoretical biogas production rates were calculated and compared to actual biogas production rates. The daily theoretical biogas production rate and the actual biogas production rate are shown in the graph of FIG. 6A, where "OLR" is organic loading rate.

Initially, the theoretical and actual biogas production rates were near equal, which was ideal as it symbolized the pilot was maximizing its biogas production. Through days 49-62, the theoretical biogas production rate was much greater than the actual biogas production rate. This period of time the system was suffering from upset conditions in the form of an excessive loading rate and sulfide toxicity. Since the system was upset, it limited its ability to produce biogas, which in turn amounted to a lower actual biogas production rate. From days 62 to 77, as the system began to recover in the days following the upset, its actual biogas production rate far exceeded its theoretical biogas production rate. During this period of time, the AnMBR effluent COD declined from 8,965 mg/l to 1,397 mg/l, therefore the difference between actual and theoretical biogas production rate may be attributed to accumulated COD being consumed by the reactor and converted into biogas.

On day 113, the system was hit with a shock loading of influent FOG. This appeared to have no immediate impact on biogas production rate. However, on day 136 the pilot began to experience air intrusion as well, which provided additional gas within the system and thereby increased the actual biogas production rate as biogas was forced out of the system to accommodate additional volume for air intrusion. On day 161, the high FOG conditions and the air intrusion issues were both resolved, and the actual biogas production rate far exceeded the theoretical biogas production rate due to previously accumulated COD being consumed. From day 183 onwards, both the theoretical and actual biogas production rates were once again nearly equivalent in value.

Biogas generated through anaerobic digestion is generally composed of methane ($CH_4$), carbon dioxide ($CO_2$), and when sulfate is present in the waste stream, hydrogen sulfide ($H_2S$). The portion of theoretical $CO_2$ production relative to $CH_4$ depends on the various compounds present within the influent wastewater stream. The fraction of theoretical $H_2S$ production relative to $CH_4$ depends on the influent sulfate concentration and certain other operational parameters (such as pH, temperature, and degradable COD).

Figure 6B:
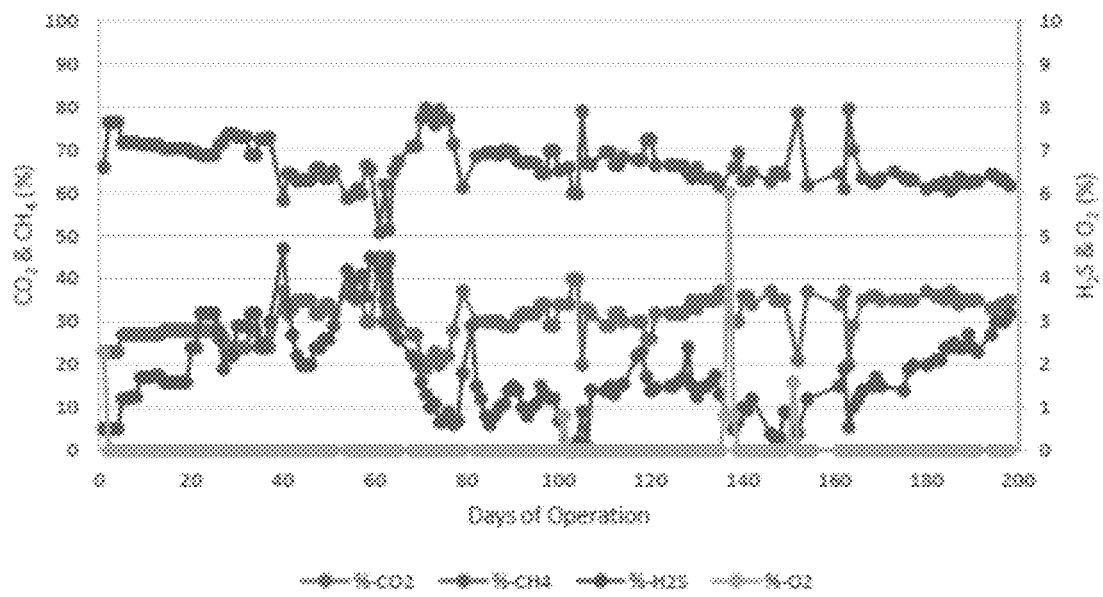
FIG. 6B is a graph of biogas composition during a pilot study, according to one embodiment.

The biogas composition over the length of the pilot study is shown in the graph of FIG. 6B. From days 1-48, the biogas composition was, on average, 69.8% $CH_4$, 27.8% $CO_2$, and 2.4% $H_2S$. From days 49-62, when the entire dilution was removed from the wastewater, the $H_2S$ concentration in the biogas increased from 2.9% to a maximum of 4.5%, which indicated that the anaerobic biomass was suffering from sulfide toxicity.

The biogas scrubber was installed on day 70. Following day 70, the average $H_2S$ concentration in the biogas was 1.5%, with a maximum of 3.2% (the maximum being in the final days of the study—as the ferric chloride scrubbing solution was likely spent). Over this period of time, the average methane concentration was 65.7%±3.9%, while the average carbon dioxide concentration was 32.8%±3.7%. Days 70 onwards demonstrated a very consistent biogas composition, with $H_2S$ concentrations consistently below levels indicative of anaerobic toxicity. Therefore, the addition of the scrubber unit was able to improve anaerobic microorganism viability and greatly enhance the anaerobic treatability of the wastewater.

Sulfur Balance and Biogas Scrubbing

Over the duration of the pilot study, an average influent sulfate concentration of 3,400 mg/l (±1,930 mg/l) was observed, with a daily maximum of 8,750 mg/l. Due to the concentration of sulfate present in the influent, it was found that attempting to maintain a COD to sulfate ratio greater than 7:1, alone, was insufficient in preventing hydrogen sulfide toxicity to the anaerobic biomass. Therefore, to alleviate sulfide toxicity, a biogas scrubbing system was incorporated into the pilot unit. This scrubbing system bubbled headspace biogas through a ferric chloride solution, which stripped $H_2S$ from the biogas. A portion of the scrubbed biogas was then used as scour gas, which pulled more sulfide out of solution to be removed in the scrubber, thus lowering the dissolved sulfide concentration to below levels inhibitory to the bacteria in the anaerobic process.

In an anaerobic wastewater treatment system, sulfate in the influent is reduced to the sulfide form by sulfide reducing bacteria (SRB), which compete with methane producing bacteria (MPB) for substrate in the anaerobic environment. For the AnMBR system with a long HRT and exceptionally long SRT, sulfate is fully reduced to sulfide. For the typical pH range of an anaerobic treatment system (i.e., 6.5-8.5), all of the sulfide is present as either $H_2S$ (unionized) or $HS^-$ (ionized).

The sulfide present in the system reaches an equilibrium between the liquid and gaseous phases (based on Henry's Law), with approximately 15-40% (temperature-dependent) of the sulfur in the system being present in the gaseous phase and the remainder present in the liquid phase. Furthermore, the sulfide present in the liquid phase comes to equilibrium between the unionized ($H_2S$) and ionized ($HS^-$) forms based on the liquid pH. By increasing the reactor pH, a lower fraction of the total dissolved sulfides will be present in the unionized form, resulting in lower $H_2S$ in the biogas.

Figure 7:
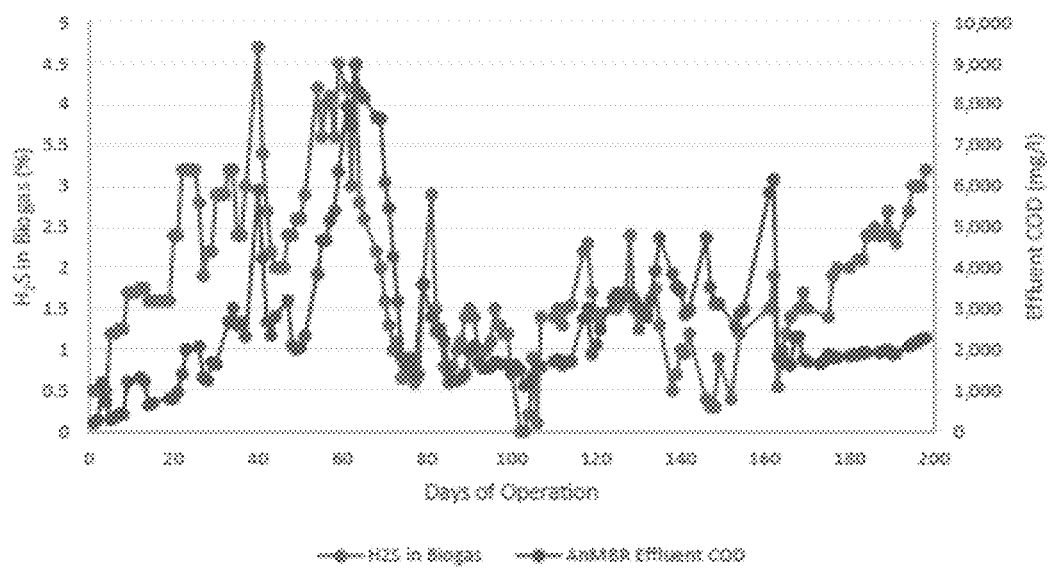
FIG. 7 is a graph of concentration of hydrogen sulfide in the biogas and effluent COD during a pilot study, according to one embodiment.

The hydrogen sulfide concentration in the biogas and effluent over the duration of the study is shown in the graph of FIG. 7. Briefly, when the $H_2S$ concentration in the biogas approached and exceeded 4%, the AnMBR effluent COD increased rapidly. Both parameters were observed to have a close relationship throughout the entirety of the pilot study. This close relationship stresses the importance of having a proficient means of sulfur reduction incorporated with the anaerobic treatment system designed to treat the wastewater. Following the installation of the scrubbing system to remove $H_2S$ from the AnMBR pilot, $H_2S$ in the biogas was maintained consistently lower than 3% and the AnMBR pilot did not suffer from sulfide toxicity.

During days 113-164, the AnMBR effluent COD was higher than usual as the system was in upset conditions due to the accumulation of FOG and air intrusion. Towards the end of the pilot study, the $H_2S$ concentration in the biogas began to increase even when being scrubbed (days 175-198), however this is most likely due to the scrubbing solution reaching its end of service life. Over the duration of the pilot study, there were a few instances where the addition of a small amount of "clean" ferric chloride to the scrubbing drum improved performance for the next few weeks, demonstrating that the ferric chloride solution could become "spent" over time.

Permeate Sulfide

The pilot system was effective at removing about 40%-90% of sulfide from the wastewater prior to sulfur oxidation. In particular, for an average influent sulfate concentration of 2910 mg/l, the average permeate sulfide concentration was 310 mg/l, with a maximum permeate sulfide concentration of 675 mg/l.

The pilot system was effective at removing 90%-96% of sulfide from the wastewater after sulfur oxidation. For an average influent sulfate concentration of 3,970 mg/l, the average post-treated permeate sulfide concentration was 170 mg/l.

Effluent Permitted Requirements

All trace metal permitted requirements were met regularly throughout the length of the study, except one outlier which was determined to be an error in testing. TSS, FOG, and pH permitted requirements were also each met regularly throughout the length of the study.

Sulfur oxidation tank effluent sulfide, on average, met the permitted requirement and also met the permitted requirement consistently throughout the final month of the study. There were a few instances where it was found to be greater than the permitted requirement, however these were generally when TSS had accumulated in the sulfur oxidation tank and was remedied through cleaning out the sulfur oxidation tank.

Sulfur oxidation tank effluent ammonia nitrogen, on average, met the permitted requirement and also consistently met the permitted requirement when not run high purposefully. During the final months of the pilot study, to ensure there was sufficient nitrogen present in the system to avoid inhibition during a period of critical performance testing, a surplus of supplemental nitrogen was added to the influent wastewater, which in turn increased the sulfur oxidation tank ammonia nitrogen. When supplemental nitrogen addition was ceased, sulfur oxidation tank ammonia nitrogen slowly declined until falling below permitted requirements for the final few weeks of the study.

Sulfur oxidation tank effluent BOD, on average, met its permitted requirement throughout the length of the study. However, there were occasions where measurements exceeded the permitted requirement of 300 mg/l. All of these occasions were during days 113-160, when the pilot was under upset conditions posed by air intrusion and FOG accumulation within the mixed liquor. Once these process issues were remedied, the sulfur oxidation tank effluent BOD regularly met the permitted requirement. Average influent and effluent concentrations for various constituents, as well as the permitted parameters, are shown in Table 1.

TABLE 1

Average Influent and AnMBR Effluent Concentrations for Various Permitted Parameters

| Parameter | Average Influent | Average Sulfur Oxidation Tank Effluent | Permitted |
|---|---|---|---|
| BOD (mg/l) | 11,160 (± 9,550) | 221 (± 222) | <300 |
| TSS (mg/l) | 2,050 (± 960) | 65 (± 79) | <350 |
| pH (s.u.) | 5.5 (± 1.2) | 9 (± 0.3) | 5-10.5 |
| $NH_3$—N (mg/l) | 89 (± 107) | 14 (± 18) | <30 |
| Sulfate/Sulfide | 3,520 (± 1,930) | 0.2 (± 0.2) | <0.5 |

Temperature, pH, and Alkalinity

Target temperature was as close to 97° F. as possible. Target pH was between 6.5-7.8. During startup, it may be beneficial to supplement the wastewater with a source of a base. Initially the feedwater was supplemented with sodium bicarbonate. The influent pH had an average value of 6.55 during this period. After this period, the influent pH had an average value of 4.79. However, pH within the reactor was maintained between 6.79-7.79 (with an average of 7.36) during the study.

Generally, there must be buffering capacity within the reactor to ensure pH is not driven too low. Over the duration of the pilot study, the VA/PA ratio was maintained consistently <0.5, indicating adequate buffering capacity, except during the aforementioned periods of system upset. For example, for a period of the study system imbalance was caused by hydrogen sulfide toxicity, which affected the bacteria that convert volatile acids to methane (methane formers or methanogens) more significantly than those which convert raw substrate into volatile acids (acid formers or acidogens), leading to an accumulation of volatile acids and reduction of pH. As a whole, the study demonstrated that regular supplemental alkalinity addition should not be required for the full-scale system; however, a pH sensor and pH adjuster (source of an acid or source of a base) may be included in the event that pH needs to be adjusted, for example, due to sulfur toxicity or at start up.

Nutrient Requirements

Nitrogen, if not present in the feed waste stream, is often supplemented through the form of urea. Phosphorous, if not present in the feed waste stream, is often supplemented through phosphoric acid. During early phases of the study, both nitrogen and phosphorous were supplemented in the feed wastewater. As the study progressed, nitrogen and phosphorous supplementation ceased for extended periods of time. Nitrogen was measured as ammonia nitrogen in the influent, AnMBR effluent, and sulfur oxidation tank effluent over the length of the study. Phosphorous was measured as orthophosphate in the influent, AnMBR effluent, and sulfur oxidation tank effluent over the length of the study.

Target nitrogen in the AnMBR effluent was greater than 10 mg-$NH_3$—N/l and $NH_3$—N concentration less than 30 mg/l in the sulfur oxidation effluent, to both provide sufficient nitrogen for good system health and meet permit limits. The sulfur oxidation tank effluent $NH_3$—N concentration, on average throughout the study, fell below the permitted requirement with an average value of 14 mg/l. The instances in which the sulfur oxidation tank effluent $NH_3$—N concentration was found to be greater than 30 mg/l was when the influent wastewater feed batches possessed supplemental nitrogen, run high purposefully.

There is currently no permitted requirement for phosphorous in the final discharge, and therefore the only target value for phosphorous was to ensure a residual $PO_4$—P concentration greater than 10 mg/l in the AnMBR effluent. Small doses of supplemental phosphorous were added to feed batches early on in the study. However, after 130 days of operation supplemental phosphorous addition was ceased and never re-commenced. After day 130, influent $PO_4$—P averaged 31 mg/l, AnMBR effluent $PO_4$—P averaged 35 mg/l, and sulfur oxidation tank effluent $PO_4$—P averaged 34 mg/l, without supplemental phosphorous addition.

Micronutrients (sulfur and trace metals) were also added to the influent wastewater. The methods may include supplementing the feed with such micronutrients at start up.

As shown by the results presented in the pilot study, the exemplary anaerobic membrane bioreactor system may effectively treat biodiesel plant wastewater. Scrubbing the biogas for removal of hydrogen sulfide reduces sulfur toxicity of the anaerobic microorganisms and reduces undesirable sulfide in the permeate.

The phraseology and terminology used herein is for the purpose of description and should not be regarded as limiting. As used herein, the term "plurality" refers to two or more items or components. The terms "comprising," "including," "carrying," "having," "containing," and "involving," whether in the written description or the claims and the like, are open-ended terms, i.e., to mean "including but not limited to." Thus, the use of such terms is meant to encompass the items listed thereafter, and equivalents thereof, as well as additional items. Only the transitional phrases "consisting of" and "consisting essentially of," are closed or semi-closed transitional phrases, respectively, with respect to the claims. Use of ordinal terms such as "first," "second," "third," and the like in the claims to modify a claim element does not by itself connote any priority, precedence, or order of one claim element over another or the temporal order in which acts of a method are performed, but are used merely as labels to distinguish one claim element having a certain name from another element having a same name (but for use of the ordinal term) to distinguish the claim elements.

Having thus described several aspects of at least one embodiment, it is to be appreciated various alterations, modifications, and improvements will readily occur to those skilled in the art. Any feature described in any embodiment may be included in or substituted for any feature of any other embodiment. Such alterations, modifications, and improvements are intended to be part of this disclosure and are intended to be within the scope of the invention. Accordingly, the foregoing description and drawings are by way of example only.

Those skilled in the art should appreciate that the parameters and configurations described herein are exemplary and that actual parameters and/or configurations will depend on the specific application in which the disclosed methods and materials are used. Those skilled in the art should also recognize or be able to ascertain, using no more than routine experimentation, equivalents to the specific embodiments disclosed.

What is claimed is:

1. A system for treating wastewater having sulfur and a chemical oxygen demand (COD), the system comprising:
   an anaerobic membrane bioreactor comprising a submerged membrane and a gas distributor positioned to scour the membrane, an influent inlet fluidly connected to a source of the wastewater, a permeate outlet, a biogas outlet, and a scrubbed biogas inlet;
   a scouring gas closed loop extending between the biogas outlet and an inlet of the gas distributor, the inlet of the gas distributor being distinct from the scrubbed biogas inlet;
   a scrubber having an inlet fluidly connectable to the biogas outlet through a first line outside of the scouring gas closed loop and an outlet fluidly connectable to the scrubbed biogas inlet through a second line outside of the scouring gas closed loop; and
   a control mechanism configured to direct a first portion of the biogas to the scrubber and a second portion of the biogas to the gas distributor.

2. The system of claim 1, wherein the control mechanism comprises a throttling valve positioned in the scouring gas closed loop.

3. The system of claim 1, further comprising a wastewater sensing subsystem configured to measure the sulfur concentration and the COD of the wastewater upstream from the influent inlet.

4. The system of claim 3, wherein the control mechanism is operatively connected to the wastewater sensing subsystem and configured to direct the first and second portions of the biogas responsive to the measurement of the sulfur concentration and the COD.

5. The system of claim 1, further comprising a biogas sensing subsystem configured to measure a hydrogen sulfide concentration of the biogas.

6. The system of claim 5, wherein the control mechanism is operatively connected to the biogas sensing subsystem and configured to direct the first and second portions of the biogas responsive to the measurement of the hydrogen sulfide concentration.

7. The system of claim 1, further comprising a permeate sensing subsystem configured to measure a sulfide concentration of the permeate.

8. The system of claim 7, wherein the control mechanism is operatively connected to the permeate sensing subsystem and configured to direct the first and second portions of the biogas responsive to the measurement of the sulfide concentration.

9. The system of claim 1, wherein the scrubber is a chemical scrubber or a biological scrubber.

10. The system of claim 9, wherein the scrubber has a scrubbing efficiency of at least 90%.

11. The system of claim 1, wherein the submerged membrane is a flat plate membrane or a hollow fiber membrane.

12. The system of claim 1, wherein the anaerobic membrane bioreactor has a microorganism population comprising methanogens.

* * * * *